(12) United States Patent  
Smith et al.

(10) Patent No.: US 8,287,048 B2
(45) Date of Patent: Oct. 16, 2012

(54) PINCH GUARD FOR A VEHICLE SEAT

(75) Inventors: James Smith, Troy, MI (US); Dirk Brassat, Clarkston, MI (US)

(73) Assignee: KEIPER GmbH & Co. KG, Kaiserslautern (DE)

( * ) Notice: Subject to any disclaimer, the term of this patent is extended or adjusted under 35 U.S.C. 154(b) by 118 days.

(21) Appl. No.: 12/974,144

(22) Filed: Dec. 21, 2010

(65) Prior Publication Data

US 2012/0153694 A1 Jun. 21, 2012

(51) Int. Cl.
*A47B 97/00* (2006.01)
*A47C 31/00* (2006.01)
(52) U.S. Cl. .............. 297/463.1; 297/463.2; 297/452.38
(58) Field of Classification Search ............... 297/463.1, 297/463.2, 452.38
See application file for complete search history.

(56) References Cited

U.S. PATENT DOCUMENTS

2010/0084903 A1 4/2010 Kammerer
2010/0264710 A1 10/2010 Lindsay

*Primary Examiner* — Lori Lyjak
(74) *Attorney, Agent, or Firm* — McGlew and Tuttle, P.C.

(57) ABSTRACT

A pinch guard for a vehicle seat (1) is provided that can be transferred from a normal use position into a step-in position. The vehicle seat (1) includes a rear foot, which is attached to a base (5) in the normal use position of the vehicle seat (1) and in the step-in position of the vehicle seat (1) the rear foot is arranged at a distance above the base (5). The vehicle seat (1) includes a rear lower pivoting axis firmly fixed to the base. The pinch guard includes at least one movable trim (17) with a pivoting axis (A), and the pivoting axis (A) of the movable trim (17) is arranged at a distance from the rear lower pivoting axis, fixed to the base of the vehicle seat (1).

15 Claims, 3 Drawing Sheets

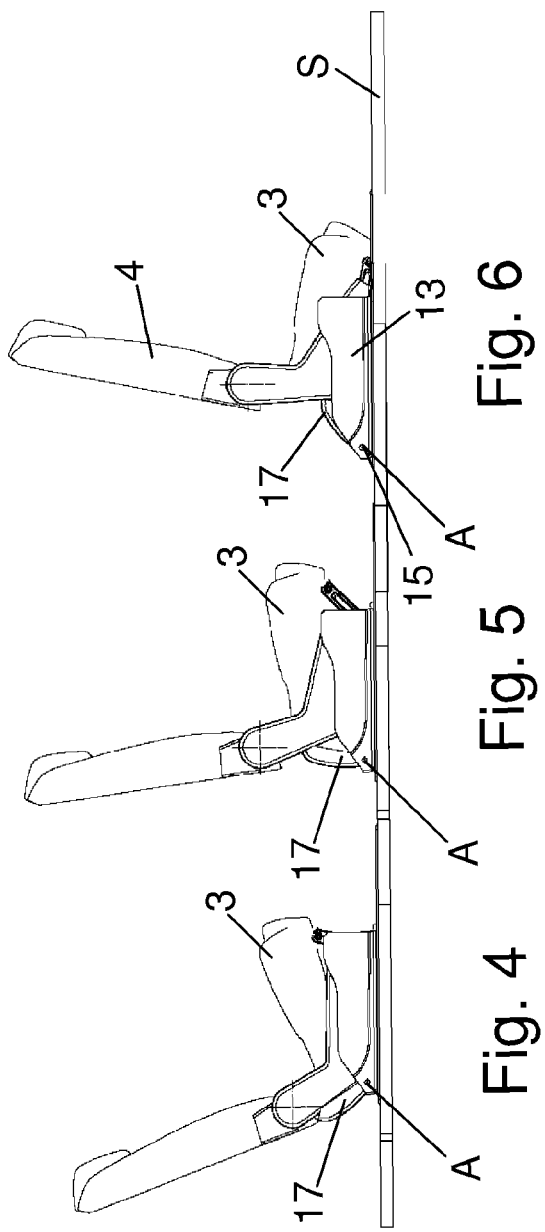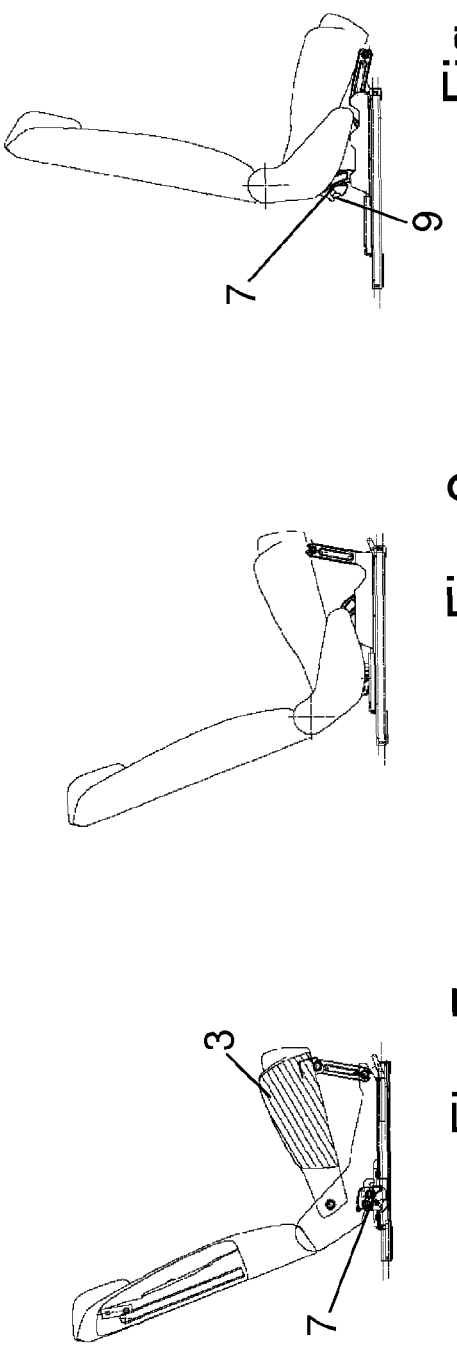

PINCH GUARD FOR A VEHICLE SEAT

FIELD OF THE INVENTION

The invention relates to a pinch guard for a vehicle seat, which may be transferred from one normal position of use into a step-in position

BACKGROUND OF THE INVENTION

From the US-patent 2010/0264710 A1 different embodiments of a pinch guard are known. According to a first embodiment, a trim secured to the base of the vehicle seat which is firmly fixed to the vehicle structure is arranged around the locking area of the rear feet of a vehicle seat, that can be tilted forward and latched rearward, in such a way that said trim shields the whole pivoting path of the foot provided with a latch at the end side. The trim extends from an area before the pivoting axis of a rear rocker of the vehicle seat linked to the base in a tiltable manner up to behind the releasable blockage of the vehicle seat. By providing the stationary trim, a car occupant is prevented from putting a foot in the pivoting area of the latch and becoming trapped between the latch and the base when rotating the vehicle seat back.

According to alternative embodiments disclosed in the US-patent 2010/0264710 A1, the trim is fan-like or bellow-like shaped. The lower side of the trim is secured to the base and the upper side is secured to the rocker of the vehicle seat, at which the latch is arranged. The pivoting axis of the rocker in this case corresponds also to the pivoting axis of the trim. Also the fan-like or bellow-like trim prevents a car occupant putting a foot in the pivoting area of the latch and thereby becomes jammed between the latch and the base when rotating the vehicle seat back.

SUMMARY OF THE INVENTION

It is an object of the invention to improve a pinch guard, especially with regard to the available space for stepping in and stepping out.

According to the invention, a pinch guard is provided for a vehicle seat that can be transferred from a normal use position into a step-in position. The vehicle seat comprises a rear foot which in the normal use position of the vehicle seat is connected with a base, and in the step-in position of the vehicle seat the rear foot is arranged with a distance above the base. The vehicle seat has a rear lower pivoting axis firmly attached to the base. The pinch guard comprises a movable trim with a pivoting axis arranged at a distance from the rear lower pivoting axis firmly attached to the base.

Due to the fact that an anti-pinch device is provided for a vehicle seat which may be transferred from a normal position of use into a step-in position, that comprises a rotatable trim around a pivoting axis, whose pivoting axis is arranged at a distance from a rear lower pivoting axis, firmly attached to the base, of the vehicle seat, an enlarged footwell results, whereby the footwell is greater than in the embodiments described in US 2010/0264710 A1 in the normal use position as well as in the step-in position.

The pivoting axis of the movable trim relative to the base is preferably stationary, i.e. the movable trim is mounted firmly at the base. This can either take place directly at the base or particularly preferably at a further trim firmly attached to the base.

The movable trim preferably presents a pivoting angle of at least 90°. With such pivoting angles the movable trim in particular can be latched rearward in the position of use, so that it is arranged nearly parallel to the rear foot and thereby occupies a space as sparse as possible, and in the step-in position it is bent forward and in turn thereby demands a space as sparse as possible.

On a part of the seat structure of the vehicle seat a trim can be firmly attached on a part of the seat structure, at which rear side a free end of the movable trim can be fitted, that is arranged at a distance from the pivoting axis of the movable trim. By providing such a trim firmly attached on the structure of the seat part an optimal sliding surface can be placed with a disposition for the relative movement between the free end of the movable trim and the vehicle seat.

A spring is preferably provided, which bears up the movable trim against the structure of the seat part or a trim firmly fixed to the structure of the seat part. This spring is preferably pre-tensed between the base or a trim firmly attached at the base and the movable trim and maintains the free end of the movable trim in said arrangement.

A particularly simple assembly, that if necessary is also possible results subsequently, when a trim firmly attached to the base is provided, at which the movable trim is arranged in a pivotable way.

Especially the spring is preferably arranged on a bolt, which is firmly attached to the base and which constitutes the pivoting axis of the movable trim.

In the following, the invention is explained in more detail with the help of an exemplary embodiment represented in the drawing. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 4 is a side view of the vehicle seat of FIG. 1 in a normal use position;

FIG. 5 is a side view of the vehicle seat of the FIG. 1 in an intermediate position;

FIG. 6 is a side view of the vehicle seat of the FIG. 1 in the step-in position;

FIG. 7 is a longitudinal section through the vehicle seat of FIG. 1 in a normal use position without the representation of the side panels and of the anti-pinch device;

FIG. 8 is a side view of the vehicle seat of FIG. 1 in a normal use position without the representation of the side panels and the anti-pinch device; and FIG. 9 is a side view in the step-in position of the vehicle seat of FIG. 1 devoid of illustration of the side panels and the anti-pinch device.

DESCRIPTION OF THE PREFERRED EMBODIMENTS

Figure 1:
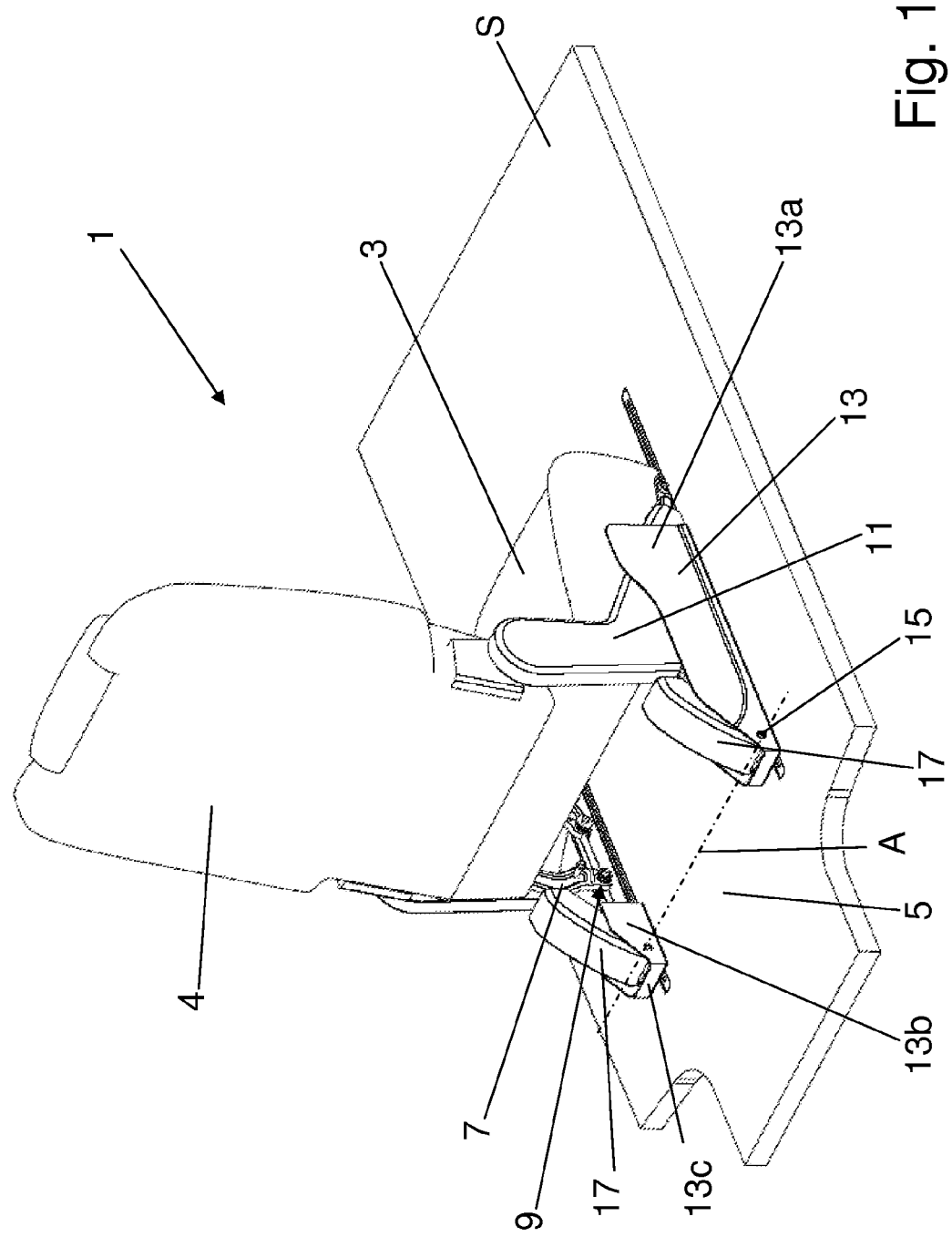
FIG. 1 is a perspective view of a vehicle seat with a pinch guard according to the invention in the step-in position of the vehicle seat.
Figure 3:
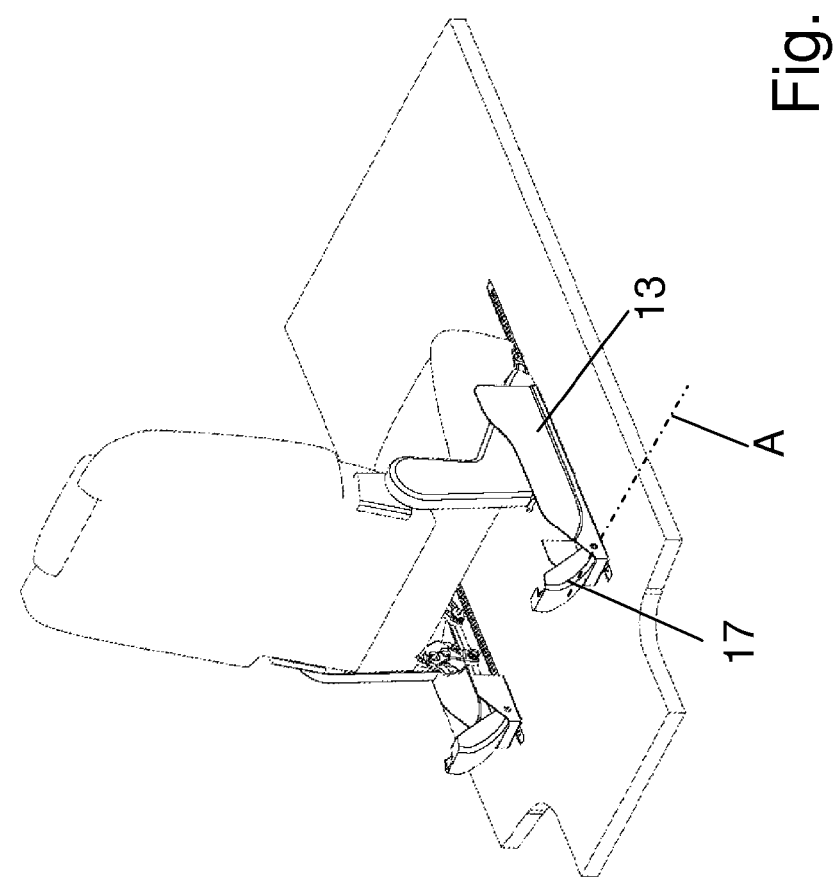
FIG. 3 is a perspective view of the vehicle seat of FIG. 1 with a representation of the vehicle seat in the step-in position and a representation of the anti-pinch device or guard in the normal position of use of the vehicle seat.
Figure 2:
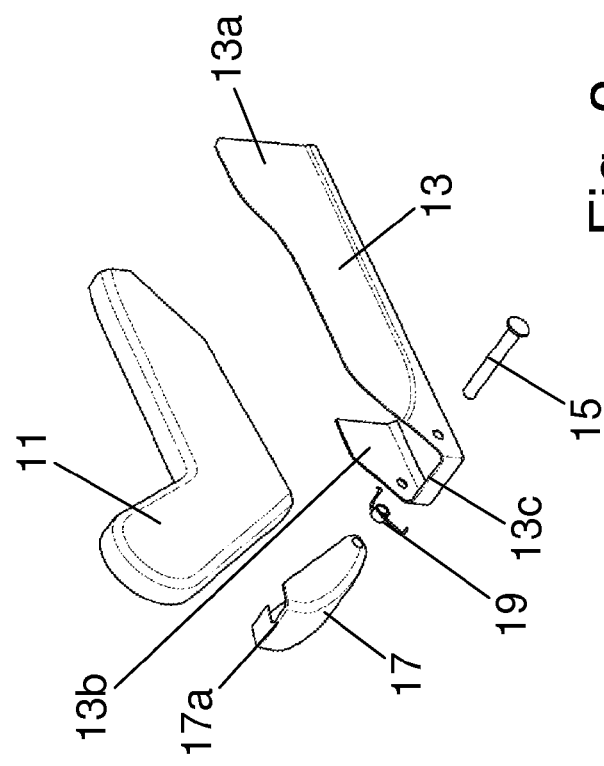
FIG. 2 is an exploded view of the anti-pinch device or guard.

Referring to the drawings in particular, a vehicle seat 1 for a front row seat of a motor vehicle presents, as part of its supporting elements, a structure of the seat part 3 and a structure of the backrest 4, which are upholstered in a generally known way. Thereby the structure of the seat part 3—for the lowering or forward tilting of the seat cushion—can be self-articulated. The structure of the seat part 3 in this case is firmly attached to the vehicle structure S of the motor vehicle, which constitutes a base 5. The structure of the seat part 3 can also be longitudinally adjustable relative to the vehicle structure S by means of a pair of seat rails, which constitute a base 5.

The vehicle seat 1 is configured in such a way, that it can be transferred from a normal use position into a step-in position. For this purpose, at the rear foot 7 in the direction of travel of the structure of the seat part 3 in each case one blockage 9 is provided, in the present case a latch, which can be detachably fitted on a supporting element, in the present case a bracket, provided at the base 5, and that jointly constitute a locking device. Such an arrangement is known for example from US 2010/0084903 A1.

On both sides of the vehicle seat a sheath can be provided, in each case on the structure of seat part 3. The sheath can be fitted, by means of it the backrest structure 4, in a pivotable and lockable manner relative to the structure of the seat part 3.

Because of the substantially mirror inverted embodiment of the vehicle seat 1, only details as to the embodiment of the pinch guard on one side are discussed in the following description.

A first trim 11 fixed firmly to the structure of the seat part is laterally arranged on the structure of the seat part 3, which is movable together with the structure of the seat part 3, especially with the rear foot 7. The trim firmly fixed on the structure of seat part 11 in the present case has, for example a V-shaped design, which results from the arrangement of the backrest structure 4 and the structure of the seat part 3. In this case the firmly fixed trim on the structure of the seat part 11 laterally covers only a rear part of the structure of the seat part and a lower part of the backrest structure 4, particularly up to slightly above the pivoting axis of the seat backrest for the adjustment of the tilted position.

At base 5 a second trim 13 firmly attached to the base is solidly arranged, which comprises a raised, outer lateral zone 13a, a notably shorter, raised, inner lateral zone 13b and a bonding zone 13c extending only slightly upwards and forward between the two lateral zones 13a, 13b.

At the second trim 13 fixed at the base, in the lower rear area, extending transversely between the two lateral zones 13a, 13b, a bolt 15 constituting a pivoting axis is fitted, for which bearing the trim firmly attached to the base 13 comprises two openings inter-aligned with each other. On the bolt 15 supported by the trim firmly fixed to base 13, a third movable trim 17, which constitutes a substantial part of the anti-pinch device or guard, is mounted in an inclined manner.

The third movable trim 17 presents a slightly curved rear area and two lateral zones extending perpendicularly to the rear area. For the support of the movable trim 17 on the bolt 15 two openings aligned with each other are provided in the lateral zones of the movable trim 17, through which bolt 15 protrudes, and which in the assembled state are placed adjacent the openings of the lateral zones of trim 13 firmly fixed to the base. The area close to the pivoting axis of the movable trim 17, in the present case, is arranged inside the rear area in direction of motion of the trim 13 firmly fixed to the base.

The movable trim 17 is pre-tensed by means of a spring 19 fitted on the bolt 15 in such a way, that the spring 19—independently from the position of the vehicle seat 1—abuts with its free end 17a, especially with the upper end of the rear area and, if necessary, with the upper end of the outer lateral zone from behind against the trim 11 firmly fitted to the structure of the seat part. The spring 19 in the present case is a wound double leg spring with two spring arms extending outwards at an angle one towards the other, in which a spring arm rests on trim 11 firmly fixed to the structure of the seat part and the second spring arm rests on the third trim 17.

The function of the pinch guard is the following, in which in turn only one side of a vehicle seat is described in more detail: in the normal use position the rear foot 7 is detachably fixed by means of said latch at said frame provided on the base 5. The movable trim 17, whose pivoting axis A is placed close to the frame, is almost arranged parallel to the foot 7 and lies against the rear area of the trim 11 firmly fixed to the structure of the seat part, in the present case in the upper area of the same. Thereby, an obliquely backward extending alignment of movable trim 17 results, whereby a footwell as large as possible for the person sitting behind the vehicle seat 1 results.

If the vehicle seat 1 is moved forward into its step-in position, so the latch unlocks and the rear foot 7 departs from the frame passing through a curved path. The trim 11 firmly fixed to the structure of the seat part is raised in the rear area while lowering the front area (see FIGS. 4-6). The forward movement of the vehicle seat 1 hereby results from a pivoting movement of a (rear) rocker around a pivoting axis (not shown) fixed relative to the base, in which a total of a curvilinear movement of foot 7 results. The curvilinear movement of the foot 7 differs hereby from the pivoting movement of the movable trim 17 around the pivoting axis A. The pivoting axis of said rocker lies in the normal travel direction before the pivoting axis of the movable trim. The free end 17a of the movable trim 17, during the pivoting movement of the movable trim 17, lies against the trim 11 because the trim 11 firmly fixed to the structure of the seat part, more precisely on whose side the movable trim 17 is arranged behind, referring to the normal travel direction, in which a relative movement likewise occurs and the free end 17a slides downwards along the trim 11 firmly fixed to the structure of the seat part.

In the step-in position of the vehicle seat 1 the rear arm of the V-shaped trim 11 firmly fixed to the structure of the seat part runs almost vertically. The movable trim 17 lying in the position with its free end 17a against the trim 11 firmly fixed to the structure of the seat part is inclined forward (see FIG. 6), having gone through a pivoting movement of approx. 90°. As a result of the pivoting movement of the movable trim 17, the rear end of the trim 13 firmly fixed to the base area of the pinch guard is arranged farthest behind. Also in this alignment of the movable trim 17 a footwell results that is as large as possible for the person sitting behind the vehicle seat 1.

Even though it is not described above, in a suitable embodiment of the rear foot 7, the trim 11 firmly fixed to the structure of the seat part 3 can be omitted, so that the movable trim 17 rests directly on the rear foot 7 or other portions of the structure of the seat part 3, pre-tensed by the spring 19, i.e. the trim 11 firmly fixed to the structure of the seat part is not necessarily a part of the pinch guard.

In case of providing a suitable support firmly fixed to the base, the trim 13 firmly fixed to the base can also be omitted, i.e. the trim 13 firmly fixed to the base is also not necessarily part of the pinch guard. This embodiment however has the disadvantage that the lateral pinch guard is less desirable.

Moreover the structure of the seat part 3 can also be designed to be different. For example it can be provided also with interlaced rockers.

Also, occupation of the step-in position can occur—instead of by changing the angles in a polygon, which is formed by swinging or similar, in association with a pivoting movement around a pivoting axis firmly fixed to the base—by means of a simple pivoting movement of the whole vehicle seat around a pivot axis firmly fixed to the base without changing the angles between swinging or the like. In this case the pivoting axis of the movable trim is also arranged with a distance from the pivoting axis, firmly fixed to the base, of the vehicle seat, while in this case only one pivoting axis for the vehicle seat exists.

While specific embodiments of the invention have been shown and described in detail to illustrate the application of the principles of the invention, it will be understood that the invention may be embodied otherwise without departing from such principles.

LIST OF REFERENCES

1 Vehicle seat
3 Structure of the seat part
4 Structure of the backrest
5 Base
7 Rear foot
9 Locking
11 Trim firmly fixed to the structure of the seat part
13 Trim firmly fixed to the base
13a Outer lateral zone
13b Internal lateral zone
13c Linking area
15 Bolt
17 Movable trim
17a Free end
19 Spring
A Pivoting axis (movable trim)
S Vehicle structure

What is claimed is:

1. A pinch guard for a vehicle seat that can be transferred from a normal use position into a step-in position, the vehicle seat comprising a rear foot which in the normal use position of the vehicle seat is connected with a base, and in the step-in position of the vehicle seat the rear foot is arranged with a distance above the base and the vehicle seat having a rear lower pivoting axis firmly attached to the base, the pinch guard comprising:
a movable trim with a pivoting axis arranged at a distance from the rear lower pivoting axis firmly attached to the base.

2. A pinch guard according to claim 1, wherein the pivoting axis of the movable trim is stationary with regard to the base.

3. A pinch guard according to claim 1, wherein the movable trim has a pivoting angle of at least 90°.

4. A pinch guard according to claim 1, wherein vehicle seat comprises a seat part structure and a trim firmly fixed on the seat part structure, the movable trim having a free end lying on a rear side of the trim firmly fixed on the seat part structure.

5. A pinch guard according to claim 1, further comprising a spring which brings the movable trim into contact with a seat part structure or a trim firmly fixed to the seat part structure.

6. A pinch guard according to claim 5, wherein the spring is pre-tensed between the base, or a trim fixed to the base, and the movable trim.

7. A pinch guard according to claim 6, wherein the spring is arranged on a bolt, which is firmly attached to the base, and which constitutes the pivoting axis of the movable trim.

8. A vehicle seat that can be transferred from a normal use position into a step-in position, the vehicle seat comprising:
a rear foot which in the normal use position of the vehicle seat is connected with a base, and in the step-in position of the vehicle seat the rear foot is arranged at a distance above the base and the vehicle seat having a rear lower pivoting axis that is stationary with regard to the base; and
a pinch guard comprising a movable trim with a pivoting axis arranged at a distance from the rear lower pivoting axis firmly attached to the base.

9. A vehicle seat according to claim 8, wherein the pivoting axis of the movable trim is stationary with regard to the base.

10. A vehicle seat according to claim 9, wherein the movable trim has a pivoting angle of at least 90°.

11. A vehicle seat according to claim 8, further comprising:
a seat part structure;
a trim firmly fixed on the seat part structure, the movable trim having a free end lying on a rear side of the trim firmly fixed on the seat part structure.

12. A vehicle seat according to claim 8, further comprising a seat part structure with at least one of a seat part structure surface and a trim firmly fixed on the seat part structure;
a spring acting to bring the movable trim into contact with one of the seat part structure surface and the trim firmly fixed to the seat part structure.

13. A vehicle seat according to claim 12, wherein the spring is pre-tensed between the base, or a trim fixed to the base, and the movable trim.

14. A vehicle seat according to claim 13, wherein the spring is arranged on a bolt, which is firmly attached to the base, and which constitutes the pivoting axis of the movable trim.

15. A vehicle seat according to claim 8, wherein the base comprises at least one of:
a vehicle structure on which the vehicle seat is fixed and
seat rails, wherein the movable trim is arranged firmly attached on the rail.

* * * * *